United States Patent
Romero et al.

(10) Patent No.: US 9,464,340 B2
(45) Date of Patent: Oct. 11, 2016

(54) METHOD FOR RECOVERY OF NOBEL METALS FROM LONG-CHAIN HYDROCARBONS, TARS, OILS

(71) Applicant: Heraeus Precious Metals GmbH & Co. KG, Hanau (DE)

(72) Inventors: Jose Manuel Romero, Hanau (DE); Bingan Liu, Suzhou (CN); Yanmei Zeng, Shanghai (CN)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 105 days.

(21) Appl. No.: 14/510,211

(22) Filed: Oct. 9, 2014

(65) Prior Publication Data

US 2015/0101455 A1   Apr. 16, 2015

(30) Foreign Application Priority Data

Oct. 11, 2013   (CN) .......................... 2013 1 0471765

(51) Int. Cl.

| | |
|---|---|
| *C22B 11/00* | (2006.01) |
| *C22B 11/02* | (2006.01) |
| *C22B 1/02* | (2006.01) |
| *C22B 3/00* | (2006.01) |
| *C22B 5/10* | (2006.01) |
| *C22B 7/00* | (2006.01) |

(52) U.S. Cl.
CPC ............... *C22B 11/026* (2013.01); *C22B 1/02* (2013.01); *C22B 5/10* (2013.01); *C22B 7/003* (2013.01); *C22B 11/00* (2013.01); *C22B 11/046* (2013.01); *Y02P 10/214* (2015.11)

(58) Field of Classification Search
None
See application file for complete search history.

(56) References Cited

U.S. PATENT DOCUMENTS

| | | |
|---|---|---|
| 4,360,380 A | 11/1982 | Zarur |
| 4,434,241 A | 2/1984 | Larkins |
| 4,650,649 A | 3/1987 | Zoeller |
| 4,687,514 A | 8/1987 | Renner et al. |

FOREIGN PATENT DOCUMENTS

| | | |
|---|---|---|
| DE | 31 34 733 C | 4/1982 |
| DE | 32 23 501 C | 12/1985 |
| JP | H02057642 A | 2/1990 |
| JP | 2008031502 A | 2/2014 |
| KR | 1020040005446 | 1/2004 |
| WO | 99 37823 A1 | 7/1999 |

OTHER PUBLICATIONS

Translation of Japan 2008-031502, Feb. 2008.*
Description of SIGMA-ALDRICH filter paper "Whatman quantitative filter paper, ashless, Grade 42", sigmaaldrich.corn.
European Search Report for EP14188121.9 dated Mar. 10, 2015.
English translation of corresponding Taiwanese Application Search Report issued dated May 8, 2015.

* cited by examiner

*Primary Examiner* — Steven Bos
(74) *Attorney, Agent, or Firm* — Norris McLaughlin & Marcus PA

(57) ABSTRACT

The present invention relates to a method for recovery of noble metals from long-chain hydrocarbons, oils or tars, comprising a thermal treatment process in the presence of a defoaming agent having an ash fraction of 0.1% by weight or more.

20 Claims, No Drawings

METHOD FOR RECOVERY OF NOBEL METALS FROM LONG-CHAIN HYDROCARBONS, TARS, OILS

This application claims priority to Chinese Patent Application No. 20131047165.9, filed on Oct. 11, 2013.

The present invention relates to a method for recovery of noble metals from long-chain hydrocarbons, oils or tars.

Catalysts play an important role in various production processes in the chemical industry. Many catalysts have a noble metal for their active centre. Catalysts that are present as heterogeneous catalysts can be removed from the reaction mixture after the reaction and, if applicable, can be reprocessed and reused.

In homogeneous catalysts, catalysts and products are present in the same phase. This makes it more difficult to separate the catalyst from the reaction mixture. The recovery of the catalyst, in particular of the noble metal it contains, is of import under these conditions as well due to the steadily rising prices of noble metals.

One important industrial process, in which homogeneous catalysts are used, is the production of acetic acid anhydride. Approximately 1 million tonnes of this product are produced annually. Mainly rhodium and iridium complexes serve as catalysts. Accordingly, large quantities of noble metals are needed for the production of the catalysts.

In order to recover the noble metals, the desired reaction product, such as acetic acid anhydride, is removed from the reaction mixture in the first step. The residue is then thickened by evaporation to reduce the total quantity. The catalyst bottoms thus obtained are long-chain hydrocarbons, oils or tars that contain the noble metals of the catalysts.

The prior art knows of different methods for recovery of noble metals from different products. Accordingly, DE 32 23 501 C1 describes a method for precipitating mainly rhodium from liquid organic residues by means of tellurium.

What remains after separation of the noble metal is an organic mixture that needs to be subjected to disposal.

It is known from DE 31 34 733 C2 and WO 99/37823 A1 to directly incinerate organic fractions of noble metal-containing residues. In this type of thermal reprocessing, the material to be treated is usually heated continuously in a furnace up to a temperature of approx. 800° C. to 1,200° C., depending on the material to be processed. This process is called ashing. The resulting noble metal-containing ash is subsequently reprocessed by wet chemical means.

If catalyst bottoms thickened by evaporation, i.e. noble metal-containing tars, for example from acetic acid anhydride production, are subjected to thermal processing, heating of the material is associated with the generation of a pronounced amount of foam. For example, heating half a liter of tar in a furnace leads to the generation of up to 200 liters of foam.

Due to this extreme increase in volume, thermal processing in terms of ashing of such catalyst bottoms is economically not feasible. Only minute amounts of tar could be ashed at any given time. Both the energy needs and the time needs would be very large.

The undesired generation of foam is a problem in other industrial processes as well. In these areas, defoaming agents, in particular those based on silicone oil, have become established.

If one adds silicone oil to the noble metal-containing tars and then heats them up, not only the tars, but also the silicone oils, decompose during the thermal treatment process. The generation of foam is not prevented. Moreover, residual silicone oil is found after ashing in the form of impurities in the noble metal-containing ash after completion of the thermal treatment. This clearly increases the time and expenses involved in the subsequent wet chemical reprocessing for recovery of the noble metals.

It is therefore the object of the present invention to provide a method for recovery of noble metal from long-chain hydrocarbons, tars or oils, in which the generation of foam is, at least largely, prevented. The defoaming agent must still be active at temperatures up to approx. 1,200° C. Moreover, the wet chemical reprocessing that usually follows after the thermal reprocessing is not to be made more complicated by the defoaming agent.

The object underlying the present invention is met through a method for thermal reprocessing of noble metal-containing tars comprising a thermal treatment process in the presence of a defoaming agent having an ash fraction of 0.1% by weight or more. A method for thermal reprocessing of noble metal-containing tars comprising a thermal treatment process in the presence of wood chips is another subject of the present invention.

In the scope of the present invention, tars are understood to be long-chained hydrocarbons, oils, highly viscous liquids or tars. These preferably are bottoms, thickened by evaporation, of homogeneous catalysts from chemical processes, such as, for example, from acetic acid anhydride production. The tars can therefore be liquid or solid at the onset of the thermal treatment process.

Said tars are mixed with the defoaming agent first and then subjected to a thermal treatment process. The thermal treatment process proceeds in a furnace, preferably in a chamber furnace. The noble metal-containing tars provided with the defoaming agent are heated to temperatures of up to approx. 1,200° C., preferably of up to approx. 1,000° C., particularly preferably of up to approx. 800° C. The furnace can be heated directly or indirectly in this context. All types of heating known according to the prior art are feasible. Aside from gas and oil heating, this also includes, for example, electrical heating.

The thermal treatment in the furnace can proceed just as well at inert or oxidising conditions. The presence of a protective gas is not required. This does not interfere with the process, though. The same applies to air and the oxygen contained therein.

The thermal treatment results in a noble metal-containing ash. Said ash is then reprocessed by wet chemical means in order to recover the noble metals contained in the tar. Pertinent methods have been described at length in the prior art.

The thermal reprocessing in the scope of the present invention thus comprises a thermal treatment process and subsequent wet chemical reprocessing of the noble metal-containing ashes obtained in the thermal treatment process.

The method according to the invention is suitable for recovery of all noble metals from tars, i.e. gold, silver, and the platinum metals, rhodium, ruthenium, palladium, osmium, iridium, and platinum. Preferably, the tars comprise rhodium and iridium, particularly preferably rhodium.

Preferably, the defoaming agent in the scope of the invention is a solid. The heating of the tars during the thermal treatment is associated with the generation of foam. The defoaming agent according to the invention ensures that the arising bubbles burst at a very early point of foam formation. Only very small bubbles are formed. This renders the increase in tar volume during the thermal treatment process negligible.

The defoaming agent and the noble metal-containing tars to be treated are first mixed with each other and then subjected to the thermal treatment process. Not only the tar ingredients, but the defoaming agent also, combust during the thermal treatment. The ash thus generated is situated on the surface and/or external membrane of the tar bubbles right when these arise. The defoaming agent ash generated during the thermal treatment then ensures that the arising tar bubbles burst right after they arise.

An ash fraction of at least 0.1% by weight is required in order to ensure that sufficient amounts of ash are produced. The ash fraction or ash content specifies the amount of combustion residue. The ash fraction is specified in units of % by weight relative to the dry substance of the defoaming agent.

If the ash fraction is less than 0.1% by weight, it is not feasible to ensure that the defoaming effect is sufficient. The volume increase of the tar again leads to the operation of the method according to the invention becoming non-economical.

The defoaming agent according to the invention preferably comprises an ash fraction of 0.5% by weight to 0.8% by weight.

The higher the ash fraction, the more impurities are present in the noble metal-containing ash. This increases the effort during the wet chemical reprocessing. The ash fraction ranging from 0.5% by weight to 0.8% by weight ensures that the amount of ash is sufficient and, simultaneously, that the impurities needing to be removed during the wet chemical reprocessing of the noble metal-containing ash for recovery of the noble metals are low.

It is preferable to add a fraction of defoaming agent of 10% by weight or more, in particular a fraction of 10% by weight to 40% by weight, relative to 100% by weight of noble metal-containing tar.

Having a weight fraction of 10% by weight, relative to 100% by weight of noble metal-containing tar, facilitates virtually complete defoaming during the thermal treatment. Having a fraction in excess of 40% by weight renders the method according to the invention uneconomical. The combustion space in the furnace, in which the thermal treatment process proceeds, is predetermined due to the furnace dimensions, which means it is limited. If said combustion space is occupied by a large fraction of defoaming agent, less space is available for the tars to be processed. Moreover, larger quantities of defoaming agent are needed. The combustion space available for the tars being smaller and the quantity of defoaming agent being larger leads to higher costs and thus to an uneconomical method.

Preferably, the defoaming agent has a porous structure. Due to the porous structure, the noble metal-containing tar can enter into the inside of the defoaming agent. In this case, a single mixing of defoaming agent and tar at the start of the method prior to the thermal treatment is sufficient. The defoaming agent does not separate. Accordingly, good mixing is ensured also during the thermal treatment process. The defoaming agent ash arising during the thermal treatment process is distributed homogeneously with respect to the arising tar bubbles in this case. This allows the requisite amount of the defoaming agent to be kept low.

It has been evident that the defoaming agent ash is present on each tar bubble as a result of its homogeneous distribution. Surprisingly, it has been evident that even few crumbs of ash on a small tar bubbles make said bubble burst.

If one mixed an ash and the tar directly and subjected said mixture to the thermal treatment process, the mixture would have to be stirred during the thermal treatment also in order to maintain a homogeneous distribution. The tars are often highly viscous or almost solid prior to the thermal treatment. It is difficult or impossible to attain a homogeneous distribution of ash in a highly viscous tar of this type. The tars liquefy at the beginning of the thermal treatment. A homogeneous distribution could be attained no earlier than at this point, i.e. during the thermal treatment. This would necessitate major equipment needs. Pertinent mixing devices would need to be stable at the temperatures of thermal treatment, i.e. up to a temperature of approx. 1,200° C.

Less viscous tars can be mixed to become homogeneous before the thermal treatment. However, this is associated with the risk of tar and added ash separating again and the added ash sedimenting, for example, especially at the start of the thermal treatment. This again would necessitate mixing during the thermal treatment. Moreover, a clearly larger amount of ash would need to be added in order to ensure that ash is present on each tar bubble. This would lead to more impurities during the wet chemical reprocessing and thus to an increase in costs.

In addition, the ash would need to be produced in a separate process first. This would mean additional energy costs and substantial time needs.

One or more natural substances, for example, can be used as defoaming agent. A natural substance in the scope of the present invention is a renewable raw material that occurs in nature. Said natural substance can already have been processed for the method according to the invention. Possible defoaming agents according to the invention are, for example, wood chips, paper containing additives, plant fibres such as hemp, flax or shredded straw, shells of cereals such as, for example, wheat, rye, rice, etc., and similar products of plant origin.

Pure extracted cellulose cannot be used, since it combusts without leaving residue.

The natural substances can be used by themselves. However, it is feasible just as well to combine different natural substances and use them jointly as defoaming agent in the method according to the invention. The relative quantitative ratios thereof are irrelevant in this context.

Another embodiment of the present invention relates to the use of one or more natural substances as defoaming agent in the thermal reprocessing of noble metal-containing tars. The natural substances specified above are used as defoaming agents in the thermal reprocessing of noble metal-containing tars, which usually comprise a noble metal content ranging from 300 to 5,000 ppm. The natural substances are particularly well-suited as defoaming agents in the thermal reprocessing of rhodium-containing tars having a rhodium content ranging from 300 to 5,000 ppm.

It is preferable to use, as defoaming agents, natural substances reduced to small pieces whose longest axis has a length of 5 mm or less, preferably of 3 mm or less, particularly preferably of 2 mm or less. The geometrical shape of the defoaming agent is irrelevant in this context, but the longest axis should not exceed the lengths specified above. If the defoaming agent is small, the distribution of the natural substances in the tar to be reprocessed is better.

Wood chips, for example, can be used as defoaming agent. It is preferable for the wood chips to be dry. Wood chips are a porous defoaming agent into which the tar can ingress. The water fraction of wood chips reduces the tar absorption capacity equivalent to the moisture content. Accordingly, the effect of wet wood chips is reduced as compared to that of dry wood chips and the distribution in the tar attained is less homogeneous as is the case with dry wood chips. The wood chips can be waste products from a sawmill. The particular type of wood is irrelevant in this context.

The invention claimed is:

1. A method for thermal reprocessing of noble metal-containing tars comprising a thermal treatment process in the presence of a defoaming agent having an ash fraction of 0.1% by weight or more, wherein the defoaming agent is one or more natural substances selected from the group consisting of wood chips, plant fibres and shells of cereals.

2. The method according to claim 1, wherein the defoaming agent comprises an ash fraction ranging from 0.5% by weight to 0.8% by weight.

3. The method according to claim 1 wherein a fraction of defoaming agent of 10% by weight or more, relative to 100% by weight of noble metal-containing tar, is added.

4. The method according to claim 1 wherein the defoaming agent possesses a porous structure.

5. The method according to claim 1, wherein the natural substances are reduced to small pieces whose longest axis has a length of 5 mm or less.

6. The method according to claim 5, wherein the defoaming agent is wood chips.

7. The method according to claim 3, wherein a fraction of defoaming agent of 10% to 40% by weight, relative to 100% by weight of noble metal-containing tar, is added.

8. The method according to claim 1, wherein the plant fibres are selected from the group consisting of hemp, flax and shredded straw.

9. The method according to claim 8, wherein the defoaming agent comprises an ash fraction ranging from 0.5% by weight to 0.8% by weight.

10. The method according to claim 8, wherein a fraction of defoaming agent of 10% by weight or more, relative to 100% by weight of noble metal-containing tar, is added.

11. The method according to claim 10, wherein a fraction of defoaming agent of 10% to 40% by weight, relative to 100% by weight of noble metal-containing tar, is added.

12. The method according to claim 8, wherein the natural substances are reduced to small pieces whose longest axis has a length of 5 mm or less.

13. The method according to claim 1, wherein the noble metal-containing tars comprise a noble metal content ranging from 300 to 5000 ppm.

14. The method according to claim 8, wherein the noble metal-containing tars comprise a noble metal content ranging from 300 to 5000 ppm.

15. The method according to claim 1, wherein the noble metal-containing tars are rhodium-containing tars having a rhodium content ranging from 300 to 5000 ppm.

16. The method according to claim 8, wherein the noble metal-containing tars are rhodium-containing tars having a rhodium content ranging from 300 to 5000 ppm.

17. The method according to claim 1, wherein the natural substances are dry wood chips.

18. The method according to claim 3, wherein the natural substances are dry wood chips.

19. The method according to claim 1, wherein the tars are mixed with the defoaming agent first and then subjected to the thermal treatment process.

20. The method according to claim 8, wherein the tars are mixed with the defoaming agent first and then subjected to the thermal treatment process.

* * * * *